(12) United States Patent
Yang et al.

(10) Patent No.: US 12,360,385 B1
(45) Date of Patent: Jul. 15, 2025

(54) SUSPENSION WIRES FOR OPTICAL IMAGE STABILIZATION (OIS) FUNCTION OF CAMERAS

(71) Applicant: Apple Inc., Cupertino, CA (US)

(72) Inventors: Qiang Yang, Fremont, CA (US); Aurelien R Hubert, Saratoga, CA (US)

(73) Assignee: Apple Inc., Cupertino, CA (US)

(*) Notice: Subject to any disclaimer, the term of this patent is extended or adjusted under 35 U.S.C. 154(b) by 588 days.

(21) Appl. No.: 17/809,263

(22) Filed: Jun. 27, 2022

Related U.S. Application Data

(60) Provisional application No. 63/217,257, filed on Jun. 30, 2021.

(51) Int. Cl.
*G02B 27/64* (2006.01)
*H04N 23/68* (2023.01)

(52) U.S. Cl.
CPC .......... *G02B 27/64* (2013.01); *H04N 23/687* (2023.01); *G03B 2205/0038* (2013.01)

(58) Field of Classification Search
CPC .... G03B 2205/0038; G03B 2205/0007; G03B 2205/0015; H04N 23/687; H04N 23/685; G02B 27/64
See application file for complete search history.

(56) References Cited

U.S. PATENT DOCUMENTS

| | | | |
|---|---|---|---|
| 10,288,897 B2 | 5/2019 | Bachar et al. | |
| 11,483,459 B2 * | 10/2022 | Saito | H04N 23/6812 |
| 2013/0050828 A1 * | 2/2013 | Sato | H04N 23/54 |
| | | | 359/557 |
| 2019/0204532 A1 | 7/2019 | Konuma et al. | |

FOREIGN PATENT DOCUMENTS

| | | | |
|---|---|---|---|
| CN | 113572918 A | * | 10/2021 |
| CN | 118828160 A | * | 10/2024 |
| WO | 2019000214 | | 1/2019 |

* cited by examiner

*Primary Examiner* — Christopher E Mahoney
(74) *Attorney, Agent, or Firm* — Robert C. Kowert; Kowert, Hood, Munyon, Rankin & Goetzel, P.C.

(57) ABSTRACT

A camera may include at least one actuator configured to move an image sensor relative to one or more lenses in one or more directions to implement an optical image stabilization (OIS) function. The camera may include a first suspension wires having one or more flexure arms to allow the image sensor to move relative to the lenses in the one or more directions for performing the OIS. The camera may further include a second suspension structure having one or more suspension wires to stabilize the image sensor and restrain it from moving in other directions.

20 Claims, 7 Drawing Sheets

SUSPENSION WIRES FOR OPTICAL IMAGE STABILIZATION (OIS) FUNCTION OF CAMERAS

This application claims benefit of priority to U.S. Provisional Application Ser. No. 63/217,257, entitled "Suspension Wires for Optical Image Stabilization (OIS) Function of Cameras," filed Jun. 30, 2021, and which is hereby incorporated herein by reference in its entirety.

BACKGROUND

Technical Field

This disclosure relates generally to a camera and more specifically to a camera including suspension wires for enhancing performance of optical image stabilization (OIS) function of the camera.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may incorporate an optical image stabilization (OIS) system for stabilizing the recorded image by varying the optical path from a lens to an image sensor of a camera. The OIS system can sense and react to external excitation/disturbance by adjusting location of the image sensor relative to the lens in an attempt to compensate for unwanted motion of the lens. Furthermore, some cameras may incorporate an autofocus (AF) mechanism whereby the object focal distance between the lens and image sensor can be adjusted to focus an object plane in front of the camera at an image plane to be captured by the image sensor.

A camera may use a suspension structure including flexure arms to provide the movability for the image sensor in a direction for implementing OIS. But meanwhile, the image sensor needs to be maintained stable and not moved in other directions for preserving performance of other functions such as AF. For instance, the image sensor may be allowed to move in a direction orthogonal to an optical axis of the lens (to implement OIS), but not in another direction in parallel to the optical axis of the lens (e.g., not to affect the AF). Thus, a dimension aspect ratio, e.g., the ratio between height and width of the flexure arms, can be significant in order to suffice both elasticity and stiffness requirements in different directions. The advent of the mobile multipurpose devices has requested for larger image sensors to be used for achieving higher image qualities. As the image sensors grow larger and heavier, the aspect ratio goes higher, and design and manufacturing of the flexure arms however becomes harder. Thus, it is desirable to have more efficient image sensor suspension structures to enhance performance of OIS function for cameras.

Figure 1:
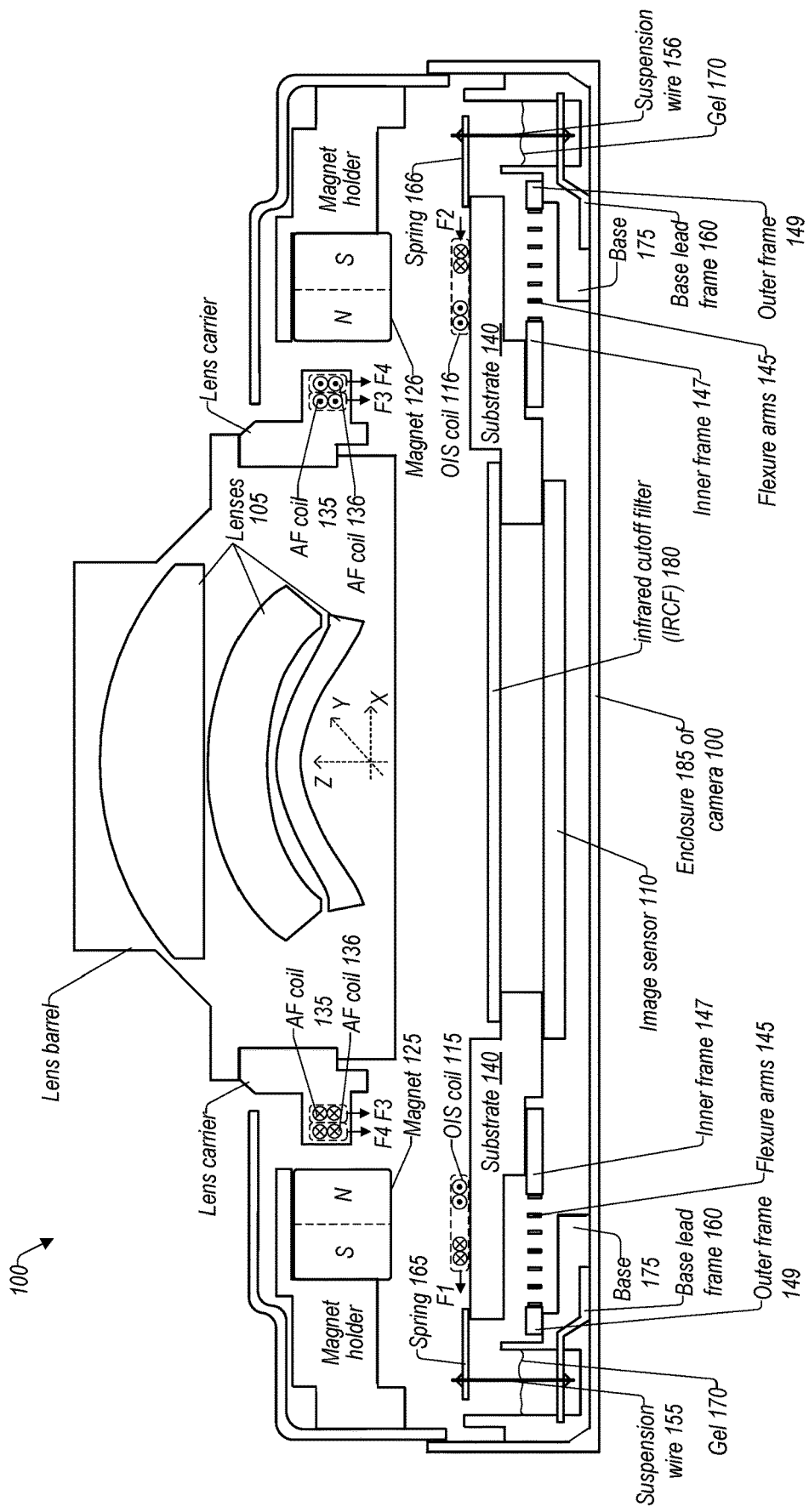
FIG. 1 shows an example camera having suspension wires, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera including suspension wires for enhancing performance of optical image stabilization (OIS) function of the camera. In some embodiments, the camera may include one or more lenses and an image sensor. The lenses may pass through light to the image sensor. The image sensor may generate image signals, e.g., electrical signals, based on the light passing through the lenses. The image signals may be further processed by a processor to produce an image. In some embodiments, the camera may also include an actuator, e.g., a voice coil motor (VCM) actuator, that may include one or more coils. The coils of the actuator may conduct current to interact with magnetic fields of one or more magnets to generate motive force (e.g., Lorentz force) to move the image sensor relative to the lenses in one or more directions (e.g., along X- and/or Y-axis) orthogonal to an optical axis of the lenses (e.g., Z-axis) to implement the OIS function. In some embodiments, the camera may include another actuator that may include one or more coils to operate to move the lenses relative to the image sensor in one or more other directions, e.g., a direction in parallel to the optical axis of the lenses (or Z-axis) for performing AF. In some embodiments, the camera may be integrated as part of a mobile multipurpose device, such as a smartphone, a tablet, a pad device, and the like.

In some embodiments, the image sensor may be attached to a substrate. The camera may include a first suspension structure comprising one or more flexure arms for suspending the substrate (together with the image sensor) from a stationary base structure of the camera. The first suspension structure may be used primarily to provide movability for the image sensor relative to the lenses along X- and/or Y-axis. In addition, in some embodiments, the camera may include a second suspension structure comprising one or more suspension wires for suspending the substrate (together with the image sensor) from the base structure. However, unlike the first suspension structure, the second suspension structure may be used primarily to restrain or limit the image sensor from moving relative to the lenses along Z-axis. Thus, in combination, the first and second suspension structures may provide elasticity and movability for the image sensor in some directions (e.g., along X- and/or Y-axis) for OIS, but also sufficient stiffness to stabilize the image sensor in other directions (e.g., along Z-axis) for maintaining performance of non-OIS functions.

The disclosed suspension structures can provide several benefits. One, the proposed design eases the design and manufacturing requirements for flexure arms. As described above, when the image sensor becomes larger and heavier, the aspect ratio of the flexure arms needs to increase in order to provide both elasticity and stiffness in different directions. This can become a challenge especially for manufacturing. Thus, by using the suspension wires to restrain movement of the image sensor along Z-axis, the flexure arms may be freed from the burden and used primarily for movement in X- and/or Y-axis. Because the flexure arms are freed from at least some of the burden on Z-axis support, design constraints around the flexure arms may be relaxed, and thus a wider range of geometries may be used while still meeting the flexure's performance requirements. This can, for example, significantly improve yield during production by allowing a wider range of manufacturing tolerance. In addition, the disclosed design adds only a few suspension wires that have small dimensions and cause a minimal change to camera design. As a result, the camera can still continuously use flexure arms and most other components and architectures. This is especially helpful for maintaining any existing supply chain, manufacturing, and/or assembly processes.

FIG. 1 shows an example camera having suspension wires, according to some embodiments. For purposes of illustration, only relevant components are illustrated in this cross-sectional view. For purposes of illustration, a coordinate system defined by X-Y-Z axes is also illustrated, where an optical axis of one or more lenses of the camera is defined as the Z-axis. In some embodiments, the optical axis may correspond to the transmission path of a principal light ray passing through the lenses to an image sensor of the camera. In some embodiments, the transmission path of the principal light ray within the camera may not necessary be a straight but rather a folded line, e.g., when the camera includes a light folding element as part of the one or more lenses that may change the transmission direction of the principal light ray. In that case, the optical axis may refer to any straight part of the folded line. In this example, camera 100 may include one or more lenses 105 and image sensor 110, according to some embodiments. Lenses 105 may pass through light to image sensor 110 to generate one or more image signals, e.g., electrical signals, that may be further processed by a processor to render an image. In some embodiments, camera 100 may include infrared cutoff filter (IRCF) 180 placed optically between lenses 105 and image sensor 110 to reduce or limit infrared light from reaching image sensor 110 to improve the image quality. In some embodiments, image sensor 110 may be attached to substrate 140 of camera 100. Substrate 140 may include an organic portion, a ceramic portion, or both organic and ceramic portions. For instance, substrate 140 may include a ceramic portion upon which image sensor 110 may be mounted, as well as an organic portion (e.g., a printed circuit board or PCB) that is attached to the ceramic portion of substrate 140 and also used to route electrical traces and/or hold other components.

In some embodiments, camera 100 may include a first suspension structure comprising one or more flexure arms 145 for suspending substrate 140 (together with image sensor 110) from stationary base structure 175 of camera 100. For instance, as indicated in FIG. 1, flexure arms 145 may extend from substrate 140 approximately within a plane (e.g., in the X-Y plane) orthogonal to the optical axis (or Z-axis) to connect inner frame 147 and outer frame 149, where inner frame 147 may be coupled with substrate 140 whilst outer frame 149 may be attached to base structure 175. In this example, flexure arms 145 may have elasticity (e.g., be able to compress or stretch) along one or more axes (e.g., X or Y-axis) orthogonal to the optical axis of lenses 105 (or Z-axis). Thus, image sensor 110 and substrate 140 may have degrees of movement freedom in X- and/or Y-axis for performing OIS. Further, as described above, flexure arms 145 may not necessarily have large enough Z-stiffness to limit movement of image sensor 110 along Z-axis, especially when image sensor 110 becomes larger and heavier.

Thus, to further stabilize image sensor 110 along Z-axis, in some embodiments, camera 100 may additionally include a second suspension structure comprising one or more suspension wires 155-156 and springs 165-166. As indicated in FIG. 1, in some embodiments, substrate 140 may be connected with springs 165-166, and springs 165-166 may extend from substrate 140 approximately within a plane (e.g., in the X-Y plane) orthogonal to the optical axis (or Z-axis) to connect with suspension wires 155-156. Further, suspension wires 155-156 may extend approximately along the optical axis (or Z-axis) to connect with base structure 175 through one or more lead frames 160. In some embodiments, lead frames 160 may be insert-molded at least partially inside base structure 175. As a result, the second suspension structure may suspend substrate 140 (and image sensor 110) from base structure 175. In some embodiments, suspension wires 155-156, springs 165-166, and/or lead frames 160 may be formed using metal, e.g., copper alloys. The joining of suspension wires 155-156 with springs 165-166, and with lead frames 160, may be implemented using soldering, e.g., jet soldering.

In some embodiments, suspension wires 155-156 may be designed to have relatively large tensile strength and stiffness in Z-axis, such that suspension wires 155-156 may support substrate 140 (and image sensor 110) but also limit their movement in Z-axis. In addition, springs 165-166 may be designed to have elasticity such that springs 165-166 may be compressed or stretched along X- and/or Y-axis. As a result, suspension wires 155-156 and springs 165-166 collectively may restrain or limit substrate 140 (and image sensor 110) from moving relative to lenses 105 in Z-axis, but not significantly affect their movement in X- and/or Y-axis (implemented using the first suspension structure as described above). In some embodiments, the restraint by the second suspension structures may not necessarily mean substrate 140 (and image sensor 110) cannot move in Z-axis at all. Rather, it means that the second suspension structure may provide more limitation to the Z-axis movement compared to using the first suspension structure alone. Further, design of the first and second suspension structures may be coordinated, such that the first structure (including flexure arms 145) may be used primarily to guide movement of substrate 140 (and image sensor 110) in X- and/or Y-axis, whilst the second suspension structure (including suspension wires 155-156 and springs 165-0166)) may be used mainly to provide support for substrate 140 (and image sensor 110) in Z-axis. In some embodiments, suspension wires 155-156 may individually have a diameter in a range from a few to tens of micrometers (e.g., μm) and having a length in a range between a few to tens of millimeters (e.g., mm). Note that in some embodiments, camera 100 may include one or more additional suspension wires and springs, e.g., additional two suspension wires (like suspension wires 155-156) and additional two associated springs (like springs 165-166) in the Y-Z plane (thus not visible in the X-Z plane cross-sectional view in FIG. 1). In some embodiments, the four suspension wires and springs may be positioned around a periphery of lenses 105, e.g., at four corners of camera 100. In some embodiments, the positions of springs 165-166 and base lead frames 160 may be exchanged. For instance, in some embodiments, substrate 140 may first be connected through one or more rigid lead frames (e.g., like base lead frames 160) to suspension wires 155-156, and then suspension wires 155-156 may be connected with base structure 175 via one or more springs (e.g., like springs 165-166). In some embodiments, the springs may be further insert-molded at least partially inside base structure 175. In some embodiments, base structure 175 may include multiple discrete components, and the first and second suspension structures may suspend substrate 140 from different parts of base structure 175. For instance, base structure 175 may include two components each affixed with enclosure 185 of camera 100. The first suspension structure may suspend substrate 140 from one component of base structure 175, whilst the second suspension structure may suspend substrate 140 from the other component.

In some embodiments, camera 100 may include one or more actuators to implement movement of image sensor 110 and/or lenses 105. For instance, camera 100 may include an OIS actuator that may include one or more OIS coils 115 and/or 116. OIS coils 115-116 may each include one or more turns of windings and be attached to substrate 140, thus be able to drag substrate 140 and image sensor 110 to move altogether as one group. OIS coils 115-116 may each conduct current that can interact with magnetic fields from proximate magnets 125 and 126, respectively. Magnets 125-126 may be contained inside respective magnet holders that may be further attached to enclosure 185 of camera 100 (and thus indirectly attached to stationary base structure 175) and thus stay stationary. In FIG. 1, the symbol of a circle with crossing inside indicates current going into the paper, whilst the symbol of a circle with dot inside refers to current coming out of the paper. The labels "N" and "S" indicate the north and south poles of a magnet, respectively. Thus, given the directions of current in OIS coils 115-116, and placement of associated magnets 125-126, the OIS coils and magnets may electromagnetically interact with each other to generate motive force (e.g., Lorentz force) F1 and F2 approximately in the negative direction of X-axis. The values and/or polarities of the current in OIS coils 115-116 may be regulated, and thus magnitudes and/or directions of the motive force F1 and F2 may be controlled. Accordingly, the motive force F1 and F2 may move OIS coils 115-116 (together with substrate 140 and image sensor 110) relative to lenses 105 along X-axis, in both negative and positive directions. As described above, in some embodiments, camera 100 may include one or more additional OIS coils and corresponding one or more magnets, e.g., two more additional OIS coils (similar to OIS coils 115-116) and two more magnets (similar to magnets 125-126) placed at two corners in the Y-Z plane (thus not visible in FIG. 1). Those additional OIS coils and magnets may operate to generate motive force (e.g., Lorentz force) to move image sensor 110 relative to lenses 105 along Y-axis. In short, camera 100 may use OIS coils and magnets, together with the above-described suspension structures, to implement the OIS function.

In addition, in some embodiments, camera 100 may include an AF actuator that may include one or more AF coils 135 and 136. AF coils 135-136 may be attached with lenses 105, e.g., indirectly through lens carrier and lens barrel that holds lenses 105. As a result, AF coils 135-136 may move lenses 105 together relative to image sensor 110. As indicated in FIG. 1, in this example, AF coils 135-136 may each include one or more turns of windings surrounding a perimeter of lenses 105 in a concentric manner in the X-Y plane. Thus, AF coils 135-136 may share the magnetic fields of magnets 125-126. Similarly, given the directions of current in AF coils 135-136, and placement of magnets 125-126, the AF coils and magnets may operate to generate motive force (e.g., Lorentz force) F3 and F4 in the negative direction of Z-axis. By regulating the values and/or polarities of the current in AF coils 135-136, magnitude and directions of the motive force F3 and F4 may be controlled. As a result, the motive force F3 and F4 may move AF coils 135-136 together with lenses 105 relative to image sensor 110 along Z-axis, in both negative and positive directions, thus performing AF. Note that in some embodiments, camera 100 may not necessarily include the AF function, and the focal distance between lenses 105 and image sensor 110 may be fixed.

In some embodiments, besides serving the mechanical purposes, the first and/or second suspension structures may also be used to transfer electrical signals between components on substrate 140 (e.g., image sensor 110) and components outside substrate 140 (e.g., power supply, image signal processor, etc.). For instance, in some embodiments, some flexure arms of the first suspension structure may be used to transfer power from a power supply to image sensor 110, whilst some suspension wires, springs and/or lead frames of the second suspension structure may be used to deliver image signals and/or control signals between image sensor 110 and an image signal processor. Alternatively, in some embodiments, some suspension wires, springs and/or lead frames of the second suspension structure may be used for power and some control signals, whilst some flexure arms of the first suspension structure may be used for power and other image signals and control signals. In still another example, electrical signals may be distributed between the first and second suspension structures in another way. In addition, in some embodiments, suspension wires 155-156 may be placed into viscoelastic material 170 (e.g., gel, grease, etc.). Viscoelastic material 170 may provide passive damping to improve performance of OIS motion control for image sensor 110.

Figure 2:
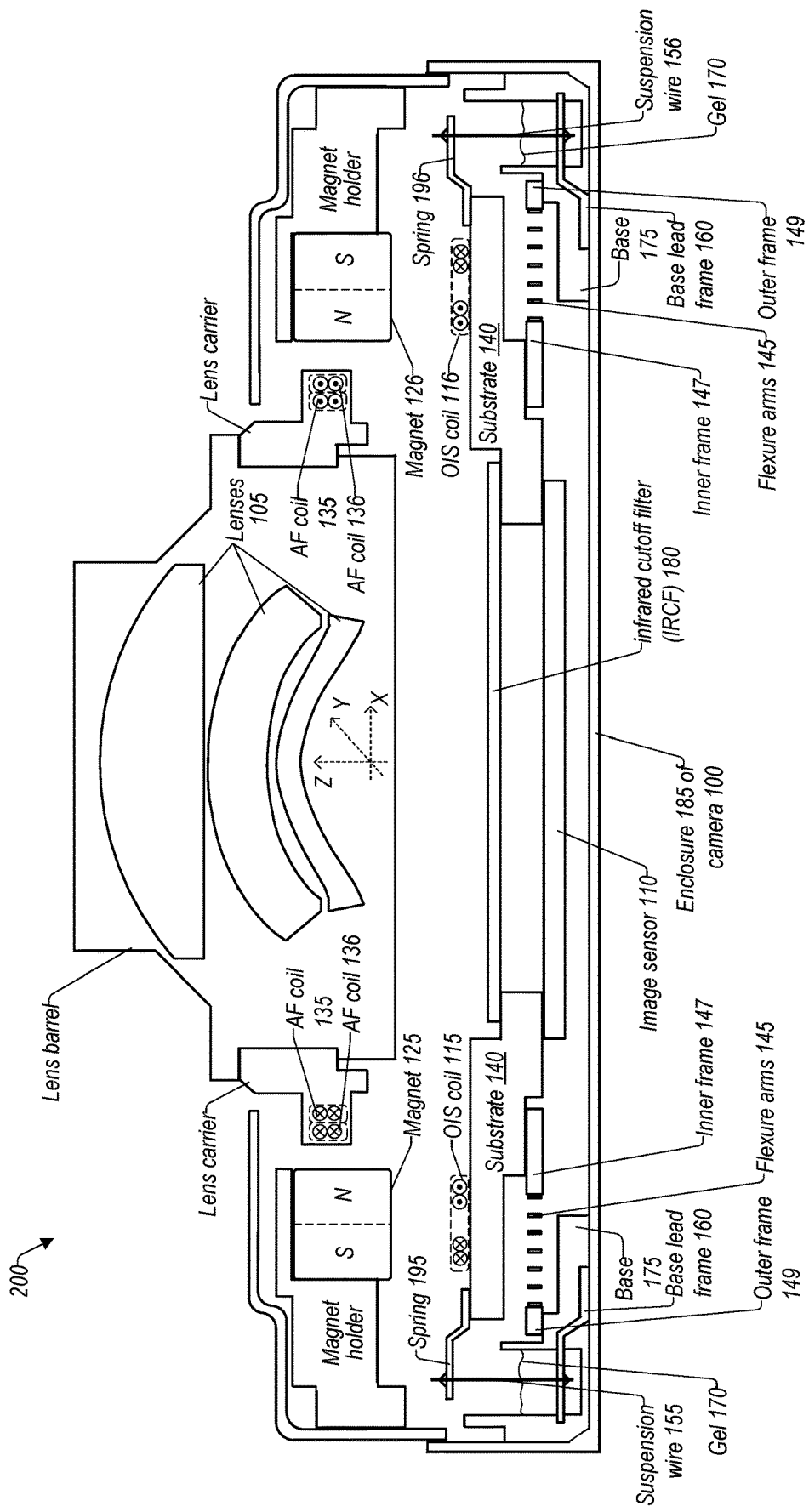
FIG. 2 shows another example camera having suspension wires, according to some embodiments.

FIG. 2 shows another example camera having suspension wires, according to some embodiments. Camera 200 in FIG. 2 is substantially similar to camera 100 in FIG. 1, except that camera 200 may use bent springs 195-196. As indicated in FIG. 2, springs 195-196 may each include at least a portion bent upwards from the X-Y plane. Note that in some embodiments, springs 195-196 may bend downwards in the negative direction of Z-axis. The bending of springs 195-196 may allow for extra length adjustment of suspension wires 155-166 for optimizing their stiffness in Z-axis and/or elasticity in X- and/or Y-axis.

Figure 3:
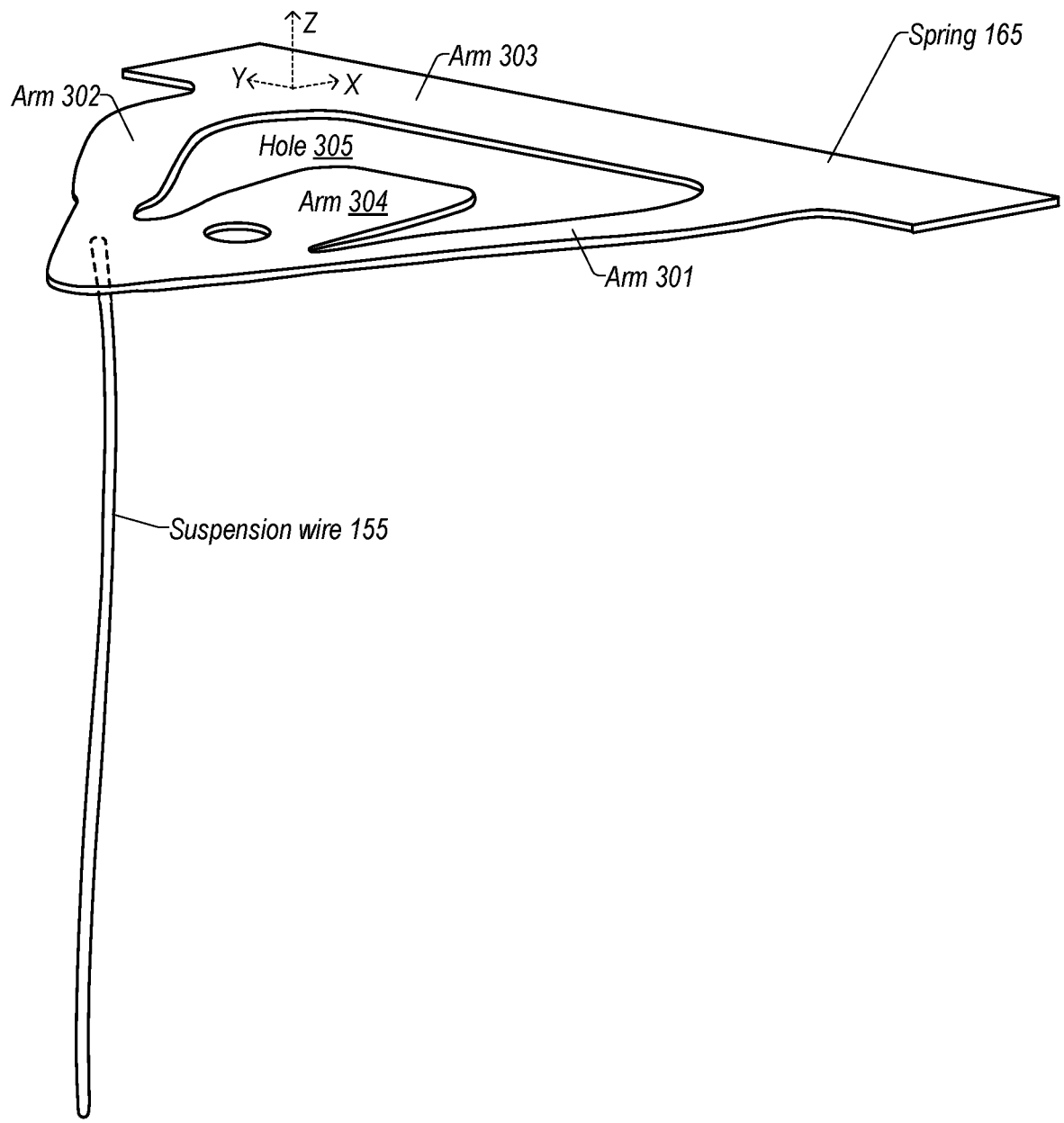
FIG. 3 shows an example suspension structure including suspension wire and spring of a camera, according to some embodiments.

FIG. 3 shows an example suspension structure including suspension wire and spring of a camera, according to some embodiments. In this example, suspension wire 155 may extend approximately along Z-axis. Suspension wire 155 may connect with spring 165 at one end of suspension wire 155, e.g., through soldering. Further, as indicated in FIG. 3, in this example, spring 165 may be a substantially flat sheet extending approximately within the X-Y plane orthogonal to the optical axis of lenses 105 (or Z-axis) of camera 100. In some embodiments, spring 165 may be designed in a pattern, such as a ring structure having hole 305 enclosed by arms 301, 302, 303, and 304. The ring structure may allow spring 165 to compress or stretch along X- and/or Y-axis. For instance, arms 301 and 302 may be pushed towards or pulled away from each other, thus causing compression or stretch along Y-axis. Similarly, arms 303 and 304 may move towards or away from each other, and create compression or stretch along X-axis. Also, in some embodiments, suspension wire 155 may be designed to have relatively large Z-stiffness in Z-axis. Thus, as a result, suspension wire 155 and spring 165 collectively may restrain or limit movement of substrate 140 (and image sensor 110) in Z-axis, but still allow for their movement in X and/or Y-axis. Note that FIG. 3 is merely provided as an example for purposes of illustration. In some embodiments, spring 165 and/or suspension wire 155 may use other geometries. What is important is that they collectively may provide required Z-stiffness, as well as elasticity in X- and/or Y-axis.

Figure 4:
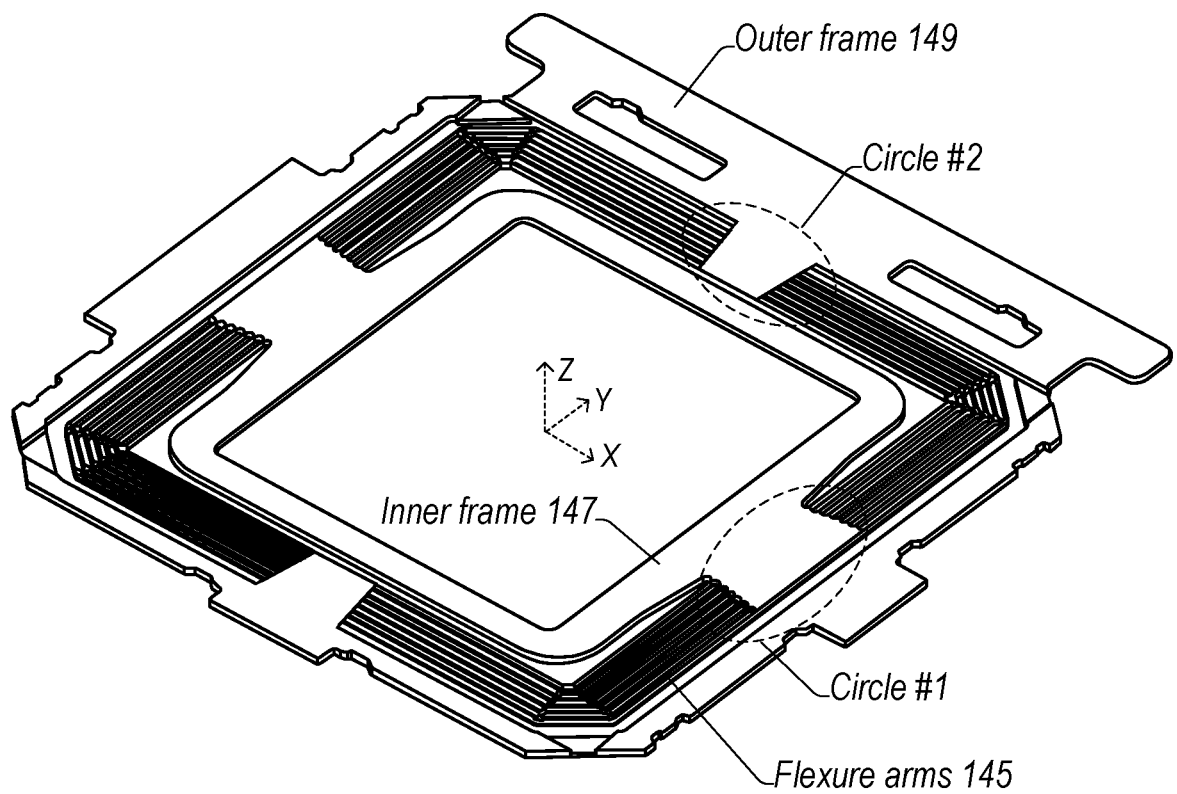
FIG. 4 shows an example suspension structure including flexure arms of a camera, according to some embodiments.

FIG. 4 shows an example suspension structure including flexure arms of a camera, according to some embodiments. As indicated in FIG. 4, in this example, flexure arms 145 may be designed in a rectangular coil-like pattern surrounding a perimeter of lenses 105 in the X-Y plane orthogonal to the optical axis of lenses 105 (or Z-axis) of camera 100. Flexure arms 145 may connect to inner frame 147 at a portion of inner frame 147 (as indicated in circle #1 in FIG. 4) that extends from inner frame 147 towards outer frame 149. Flexure arms 145 may also connect to outer frame 149 at a portion of outer frame 149 (as indicated in circle #2 in FIG. 4) that extends from outer frame 149 towards inner frame 147. As described above, inner frame 147 may be further attached with substrate 140, whilst outer frame 149 may be coupled with base structure 175. As a result, the suspension structure including flexure arms 145 in FIG. 4 may allow image sensor 110 to move in X- and/or Y-axis. Further, because flexure arms 145 may compress and stretch primarily in the X-Y plane, they may not necessarily provide sufficient restriction for movement of image sensor 110 in Z-axis. Thus, as a result, camera 100 may use a second suspension structure, as described above in FIGS. 1-3 to further enhance Z-stiffness for performance of OIS function of camera 100.

Figure 5:
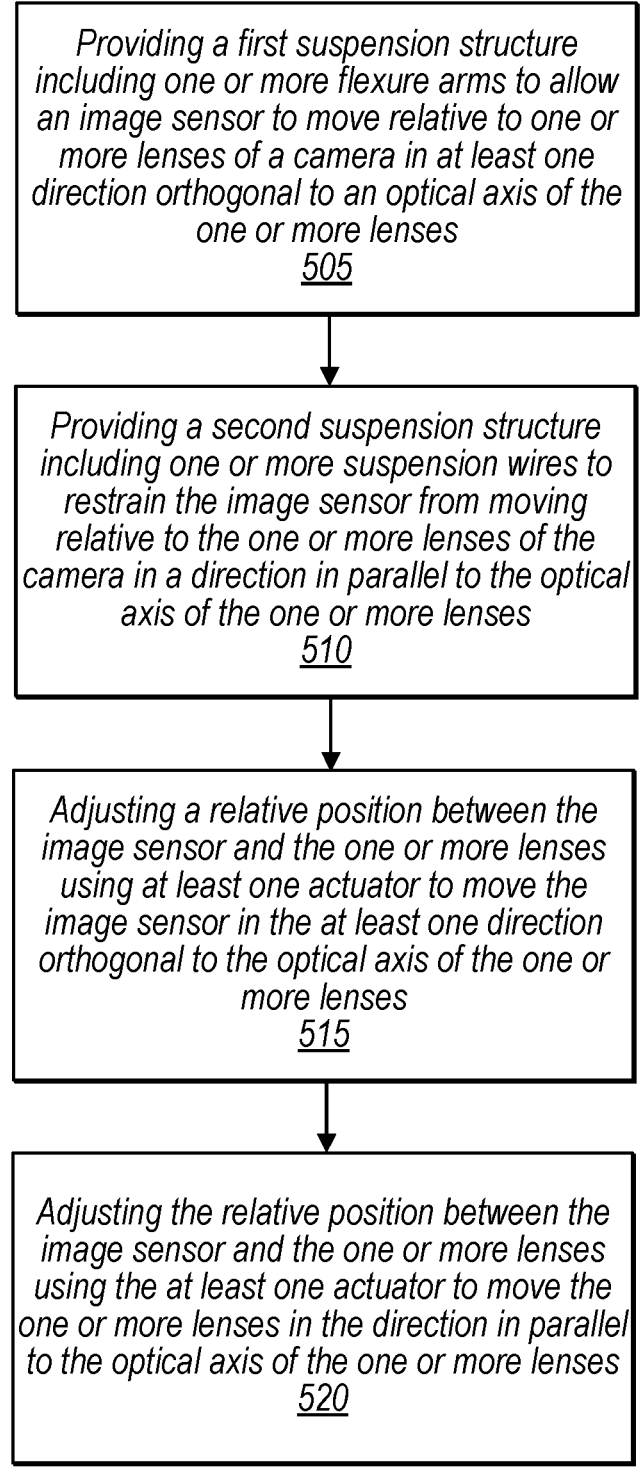
FIG. 5 is a high-level flowchart showing an example method for using suspension wires to enhance performance of OIS function for a camera, according to some embodiments.

FIG. 5 is a high-level flowchart showing an example method for using suspension wires to enhance performance of OIS function for a camera, according to some embodiments. As shown in FIG. 5, in some embodiments, a first suspension structure including one or more flexure arms (like the suspension structure described above) may be provided to allow an image sensor to move relative to one or more lenses of a camera in at least one direction (e.g., X- and/or Y-axis) orthogonal to an optical axis of the one or more lenses (or Z-axis), as indicated in FIG. 505. As described, in some embodiments, the image sensor may be attached to a substrate, and the first suspension structure may suspend the substrate from a stationary base structure of the camera.

In addition, in some embodiments, a second suspension structure including one or more suspension wires (like the suspension structure described above) may be provided to restrain the image sensor from moving relative to the one or more lenses in a direction in parallel to the optical axis of the one or more lenses, as indicated in block 510. As described above, in some embodiments, the flexure arms of the first suspension structure may not necessarily be strong enough to limit movement of the image sensor along Z-axis. Thus, the camera may use the second suspension structure to further enhance stabilization of the image sensor in Z-axis. The suspension wires may include multiple suspension wires arranged at several locations, e.g., around a perimeter of the lenses. In some embodiments, the suspension wires may extend along Z-axis connecting the substrate (upon which the image sensor may be mounted) to the stationary base structure of the camera. For instance, the suspension wires may connect with the substrate via one or more springs at one end, and with the base structure at the other end. The springs may include a flat spring tab attached to the substrate and extending from the substrate in a plane (e.g., X-Y plane) orthogonal to Z-axis. In some embodiments, the springs may include a bent spring tab having at least one portion bent away from the plane (e.g., X-Y plane) orthogonal to Z-axis, to provide more length adjustment for the connected suspension wires to optimize their stiffness in Z-axis and/or elasticity in X- and/or Y-axis.

In some embodiments, the camera my include at least one actuator (e.g., an OIS actuator as described above) that may be able to move the image sensor relative to the one or more lenses in the at least one direction orthogonal to the optical axis of the lenses, as indicated in block 515. As described above, this may adjust the relative position between the image sensor and the lenses to compensate for unwanted motion of the lenses to implement OIS function.

In some embodiments, the camera may be also able to move the one or more lenses relative to the image sensor in the direction in parallel to the optical axis of the lenses, as indicated in block 520. As described above, this may adjust the relative position between the image sensor and the lenses to change the focal distance to implement AF function.

Figure 6:
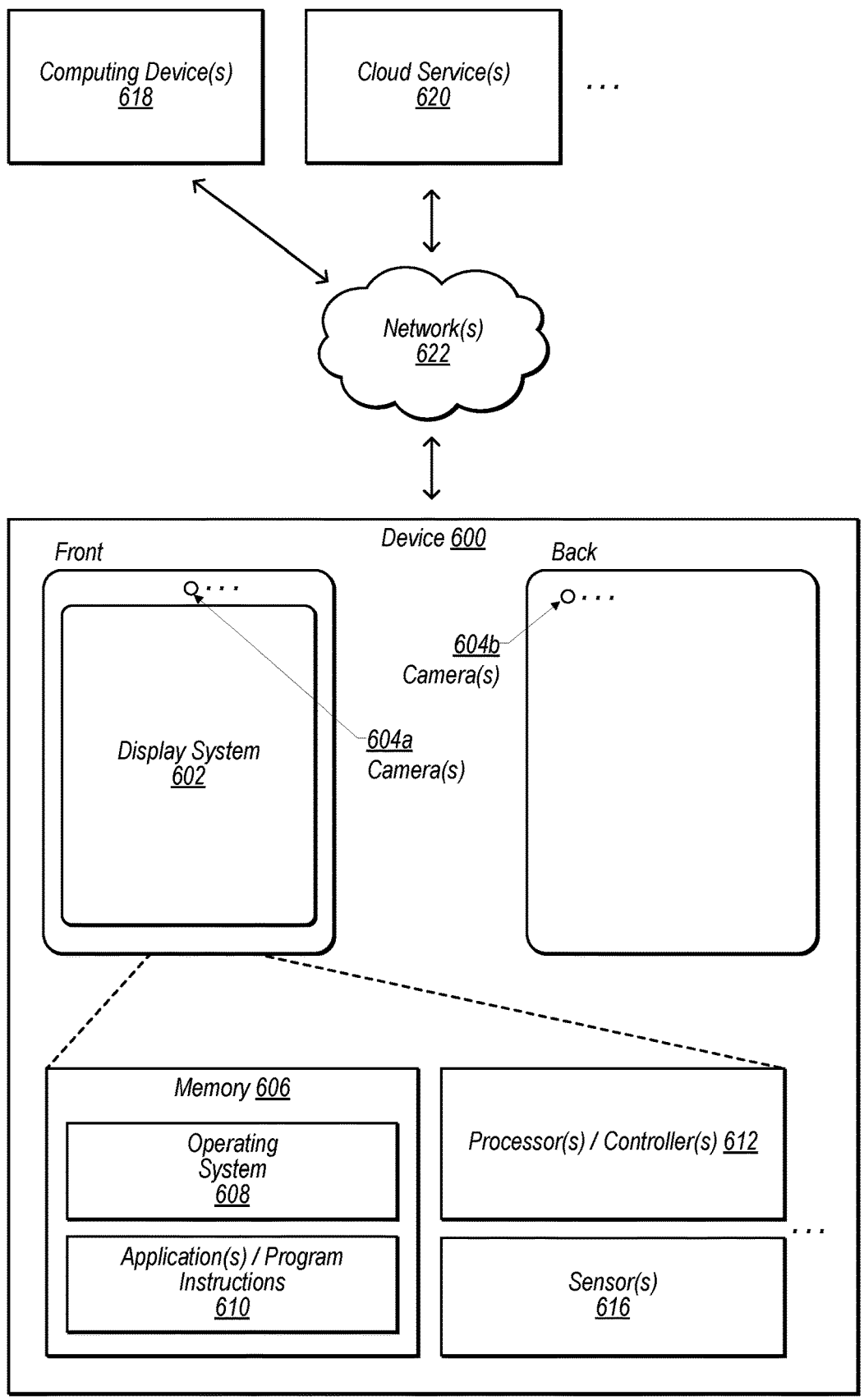
FIG. 6 shows a schematic representation of an example device that may include a camera having suspension wires to enhance performance of OIS function, according to some embodiments.

FIG. 6 illustrates a schematic representation of an example device 600 that may include a camera having suspension wires to enhance performance of OIS function, e.g., as described herein with reference to FIGS. 1-5, according to some embodiments. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 6. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 616 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 710) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
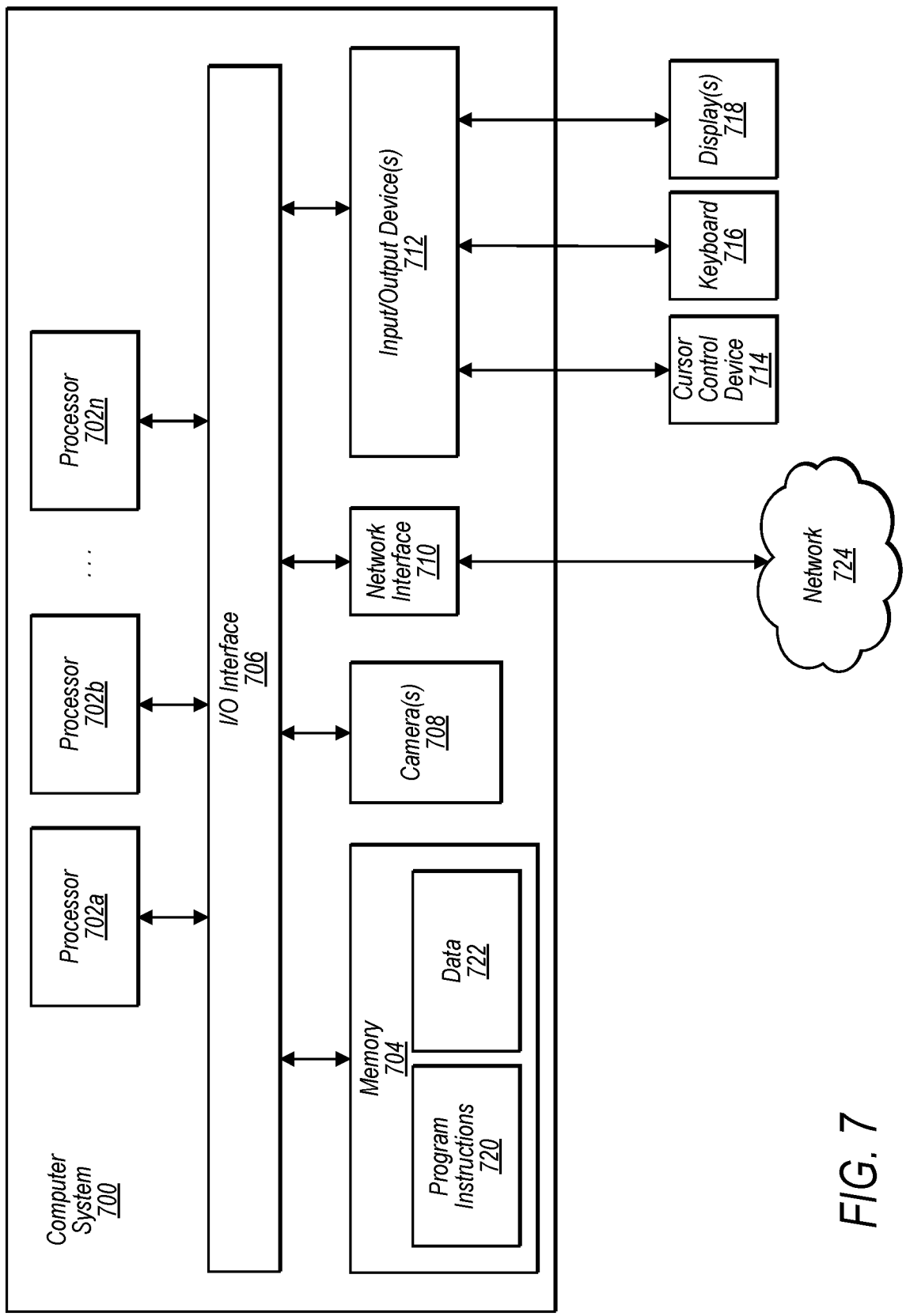
FIG. 7 shows a schematic block diagram of an example computer system that may include a camera having suspension wires to enhance performance of OIS function, according to some embodiments.

FIG. 7 illustrates a schematic block diagram of an example computing device, referred to as computer system 700, that may include or host embodiments of a camera having suspension wires to enhance performance of OIS function, e.g., as described herein with reference to FIGS. 1-6, according to some embodiments. In addition, computer system 700 may implement methods for controlling operations of the camera and/or for performing image processing images captured with the camera. In some embodiments, the device 600 (described herein with reference to FIG. 6) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system

700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 702 may include additional types of processors, such as graphics processing units (GPUs), application specific integrated circuits (ASICs), etc. In multiprocessor systems, each of processors 702 may commonly, but not necessarily, implement the same ISA. In some embodiments, computer system 700 may be implemented as a system on a chip (SoC). For example, in some embodiments, processors 702, memory 704, I/O interface 706 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   one or more lenses;
   an image sensor attached to a substrate;
   a first suspension structure for suspending the substrate from a base structure, wherein the first suspension structure comprises one or more flexure arms configured to allow the image sensor to move relative to the one or more lenses in at least one direction orthogonal to an optical axis of the one or more lenses; and
   a second suspension structure for suspending the substrate from the base structure, wherein the second suspension structure comprises one or more suspension wires and one or more springs configured to restrain the image sensor from moving relative to the one or more lenses in a direction in parallel to the optical axis of the one or more lenses.

2. The device of claim 1, wherein the one or more suspension wires extend in the direction in parallel to the optical axis of the one or more lenses connecting to the substrate via the one or more springs.

3. The device of claim 1, wherein the one or more springs include at least one spring tab extending along a plane orthogonal to the optical axis of the one or more lenses.

4. The device of claim 1, wherein the one or more springs include at least one spring tab having a portion bent away from a plane orthogonal to the optical axis of the one or more lenses.

5. The device of claim 1, wherein the one or more suspension wires connect to the base structure via one or more metal frames insert-molded at least partially inside the base structure.

6. The device of claim 1, wherein the one or more suspension wires include at least one suspension wire having a diameter in a range from a few to tens of micrometers and having a length in a range between a few to tens of millimeters.

7. The device of claim 1, wherein at least one of the one or more suspension wires is used to transfer an electrical signal to or from the image sensor attached to the substrate.

8. The device of claim 1, wherein the one or more suspension wires include multiple suspension wires positioned around a perimeter of the one or more lenses.

9. The device of claim 1, wherein the one or more flexure arms individually extend along a plane orthogonal to the optical axis of the one or more lenses connecting the substrate with the base structure.

10. The device of claim 1, wherein the one or more lenses are configured to move relative to the image sensor in the direction in parallel to the optical axis of the one or more lenses.

11. A device, comprising:
    one or more lenses;
    an image sensor attached to a substrate and configured to generate image signals based on light passing through the one or more lenses;
    a processor configured to process the image signals from the image sensor to generate an image;
    a first suspension structure comprising one or more flexure arms configured to allow the image sensor to move relative to the one or more lenses in at least one direction orthogonal to an optical axis of the one or more lenses; and
    a second suspension structure comprising one or more suspension wires and one or more springs configured to restrain the image sensor from moving relative to the one or more lenses in a direction in parallel to the optical axis of the one or more lenses.

12. The device of claim 11, wherein the one or more suspension wires extend in the direction in parallel to the optical axis of the one or more lenses connecting to the substrate via the one or more springs.

13. The device of claim 11, wherein the one or more springs include at least one spring tab extending along a plane orthogonal to the optical axis of the one or more lenses.

14. The device of claim 11, wherein the one or more springs include at least one spring tab having a portion bent away from a plane orthogonal to the optical axis of the one or more lenses.

15. The device of claim 11, wherein the one or more suspension wires include at least one suspension wire having a diameter in a range from a few to tens of micrometers and having a length in a range between a few to tens of millimeters.

16. The device of claim 11, wherein at least one of the one or more suspension wires is used to transfer an electrical signal to or from the image sensor attached to the substrate.

17. The device of claim 11, wherein the one or more lenses are configured to move relative to the image sensor in the direction in parallel to the optical axis of the one or more lenses.

18. A method, comprising:
    providing a first suspension structure including one or more flexure arms to allow an image sensor to move relative to one or more lenses of a camera in at least one direction orthogonal to an optical axis of the one or more lenses;
    providing a second suspension structure including one or more suspension wires and one or more springs to restrain the image sensor from moving relative to the one or more lenses of the camera in a direction in parallel to the optical axis of the one or more lenses;

adjusting a relative position between the image sensor and the one or more lenses using at least one actuator to move the image sensor in the at least one direction orthogonal to the optical axis of the one or more lenses.

19. The method of claim 18, further comprising:

adjusting the relative position between the image sensor and one or more lenses using the at least one actuator to move the one or more lenses in the direction in parallel to the optical axis of the one or more lenses.

20. The method of claim 18, further comprising:

transferring at least one electrical signal to or from the image sensor using at least one of the one or more suspension wires.

* * * * *